United States Patent
Henze

(10) Patent No.: US 6,318,655 B1
(45) Date of Patent: Nov. 20, 2001

(54) DRAG APPARATUS FOR CONVENTIONAL AND SPINNING REELS

(75) Inventor: Herbert Henze, Philadelphia, PA (US)

(73) Assignee: Penn Fishing Tackle Maufacturing Co., Philadelphia, PA (US)

( * ) Notice: Subject to any disclaimer, the term of this patent is extended or adjusted under 35 U.S.C. 154(b) by 0 days.

(21) Appl. No.: 09/594,525

(22) Filed: Jun. 14, 2000

(51) Int. Cl.[7] ................................................. A01K 89/02
(52) U.S. Cl. .................................................. 242/244
(58) Field of Search ........................... 242/244, 245, 242/246

(56) References Cited

U.S. PATENT DOCUMENTS

| | | | | |
|---|---|---|---|---|
| 3,254,861 | * | 6/1966 | Jahn | 242/246 |
| 3,682,411 | * | 8/1972 | Dumbauld | 242/246 |
| 4,488,689 | * | 12/1984 | Councilman | 242/245 |
| 4,549,702 | * | 10/1985 | Councilman | 242/246 |
| 4,664,330 | * | 5/1987 | Darden | 242/244 |
| 4,728,054 | * | 3/1988 | Pisapio | 242/245 |
| 5,118,048 | * | 6/1992 | Childre et al. | 242/245 |
| 5,607,114 | * | 3/1997 | Henriksson | 242/244 |

FOREIGN PATENT DOCUMENTS

2123661 * 2/1984 (GB) ................................. 242/245

* cited by examiner

*Primary Examiner*—Emmanuel M. Marcelo
(74) *Attorney, Agent, or Firm*—Frank J. Benasutti

(57) ABSTRACT

A drag mechanism in a fishing reel consists of a plurality of washers. Some of the washers are metal while others are made of a high friction co-efficient material and are keyed to the main drive gear in the reel by means of a plurality of ears extending from the periphery thereof. This can be applied to conventional and spinning reels. By rearranging the position of the metal washers and high friction washers, the drag can be varied.

12 Claims, 7 Drawing Sheets

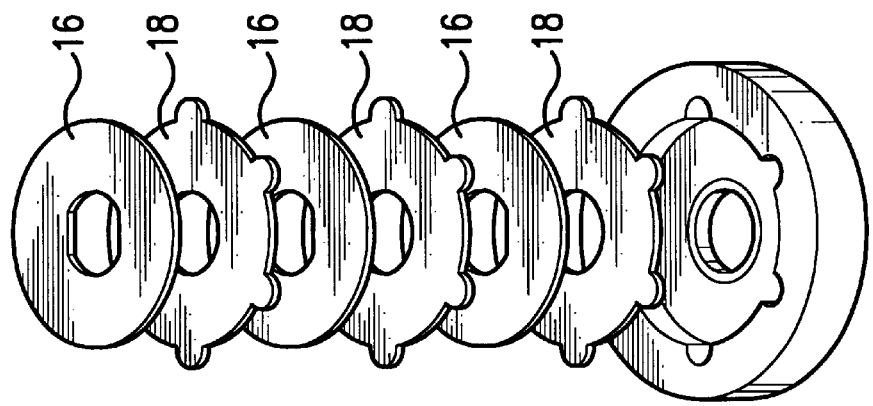
LEVEL 5 FIG. 3
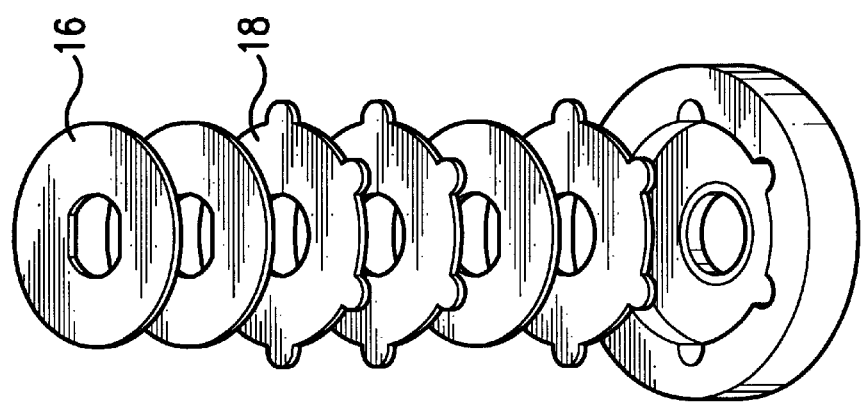
LEVEL 3 FIG. 2
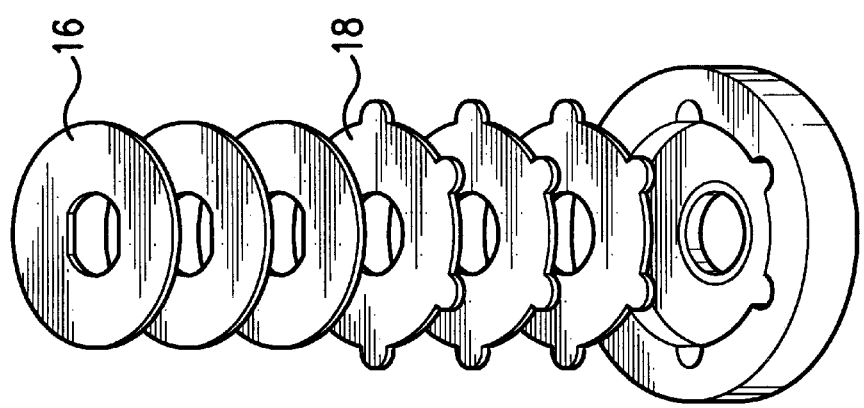
LEVEL 1 FIG. 1

DRAG APPARATUS FOR CONVENTIONAL AND SPINNING REELS

BACKGROUND OF THE INVENTION

1. Field of the Invention

This invention relates to drag mechanisms for conventional and spinning reels and, more particularly, to a drag apparatus utilizing drag washers of different materials.

2. Description of the Prior Art

The prior art teaches fishing reels showing stacks of drag washers comprising metal washers having peripheral protrusions alternating with washers made of a friction material without peripheral protrusions. See, for example, U.S. Pat. Nos. 4,488,689, 4,796,828, 3,682,411, 5,603,465, and 4,728,054, all of which pertain to spinning style fishing reels; and U.S. Pat. No. 2,760,736 which pertains to a motor-driven spool and clutch mechanism for a fishing reel.

In a conventional reel, the drag works as a clutch between the main gear and the gear stud. The drag setting will determine the torque needed to rotate the main gear relative to the gear stud. In prior art reels, the drag consists of alternating friction material washers and metal washers nested in a pocket in the main gear. A typical stack would consist of a friction material washer, a metal washer keyed to the gear stud, another friction material washer, a metal washer keyed to the main gear, a third friction material washer, and finally a second metal washer keyed to the gear stud. When the main gear rotates relative to the gear stud, three drag surfaces work to resist this rotation. The main gear turns relative to the first washer keyed to the gear stud. The first washer keyed to the-, gear stud turns relative to the first washer keyed to the main gear; and the first washer keyed to the main gear turns relative to the second washer keyed to the gear stud. These three pairs sandwich the three friction material washers; resulting in only three effective drag surfaces.

It is desirable to increase the performance of these drag mechanisms. These mechanisms all exhibit a slipping characteristic; that is, the prior art mechanisms stuck and then slipped when the drag was used. Only one side of each friction material washer was forced to move relative to its adjoining washer.

Accordingly, it is an object of this invention to improve upon the drag produced by that mechanism and greatly improve the effectiveness of the drag apparatus.

A further object of this invention is to provide a ready means of varying the drag by varying the arrangements of the drag washers to adjust for different kinds of fishing; where the same number of washers are used in the drag mechanism.

These and other objects of the invention will become apparent from the following description with reference to the accompanying drawings.

SUMMARY OF THE INVENTION

In my improved drag stack, the friction material washers are made in a rigid form. Protrusions are added to the outside diameter of these drag washers. The protrusions or ears are keyed within slots around the perimeter of the main gear pocket in order to prevent rotation of the friction material washers relative to the main gear. A drag stack consisting of the same number of components as the prior art stack described above would be made up of a friction material washer, a metal washer keyed to the gear stud, a second friction material washer, a second metal washer keyed to the gear stud, a third friction material washer, and a third metal washer keyed to the gear stud. In this improved configuration, when the main gear rotates relative to the gear stud, five drag surfaces work to resist this rotation. A first working surface of a first friction material drag washer turns relative to the adjoining surface of a first metal washer keyed to the gear stud. The other surface of the first keyed metal washer turns relative to an adjoining surface of second friction material drag washer. The other surface of the second friction material drag washer turns relative to the adjacent surface of the second keyed metal washer. The other surface of the second keyed metal washer turns relative to the adjoining surface of the third friction material washer. Finally, an adjacent surface of the third metal keyed washer turns relative to an adjacent surface of the third friction material drag washer, resulting in five effective drag surfaces. All friction material washers that adjoin metal drag washers are forced to rotate relative to them.

The same drag improvement can also be adapted to increase drag torque in fixed spools. Inside diameters of the metal washers are keyed to the spool stud shaft, while the outside diameters of the friction material drag washers are keyed to the spool by peripheral radially extending ears.

This drag stack can be used with both conventional and spinning reels. The benefit of this drag is that on a typical reel utilizing three washers made from a friction material, there will be a 60% or more increase in the drag's torque for a given normal force placed on the drag stack, than would have been obtained by a prior art stack.

Another useful and innovative attribute of the improved drag system is the ability to arrange drag washers according to expected fishing conditions.

Simply by rearranging the layers of washers, a user can obtain one working frictional surface for a light, sensitive drag of 2–4 pounds tension (level 1), while another arrangement will provide the working frictional surfaces for a medium drag of 4–8 pounds (level 3) tension of the fishing line. Yet another arrangement will allow the maximum of five working frictional surfaces for a heavy drag of 6–12 (level 5) pounds tension of the fishing line. See FIGS. 1, 2 and 3 and the plot 555—Drag Test, FIG. 4.

Thus, the unique shape of the fiber washers allows the user to increase maximum drag 60% more than the standard prior art style drag washer stack, while still allowing the user to attenuate the drag for light fishing application.

In accordance with my invention, both sides of the friction material are active. This is because the drag washers which are eared are made of a friction material.

BRIEF DESCRIPTION OF THE DRAWINGS

FIG. 1 shows an exploded perspective view of a drag washer apparatus for use in a revolving spool reel;

FIG. 2 shows the apparatus of FIG. 1 with a different arrangement of washers;

FIG. 3 shows the apparatus of FIG. 1 with a different arrangement of washers;

DESCRIPTION OF THE PREFERRED EMBODIMENTS

Figure 4:
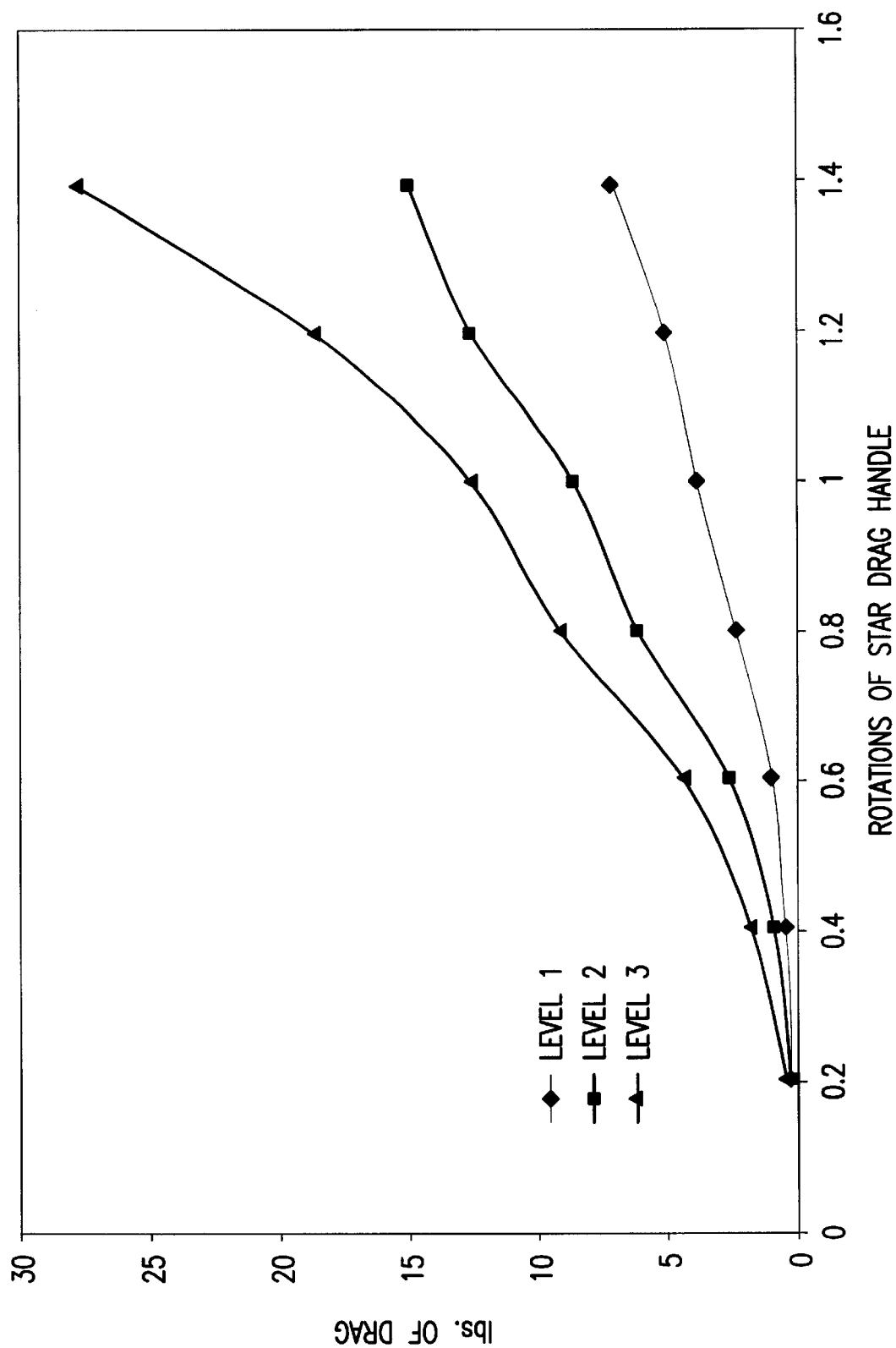
FIG. 4 is a chart of a drag test conducted with the washers shown in FIGS. 1, 2 and 3.
Figure 5:
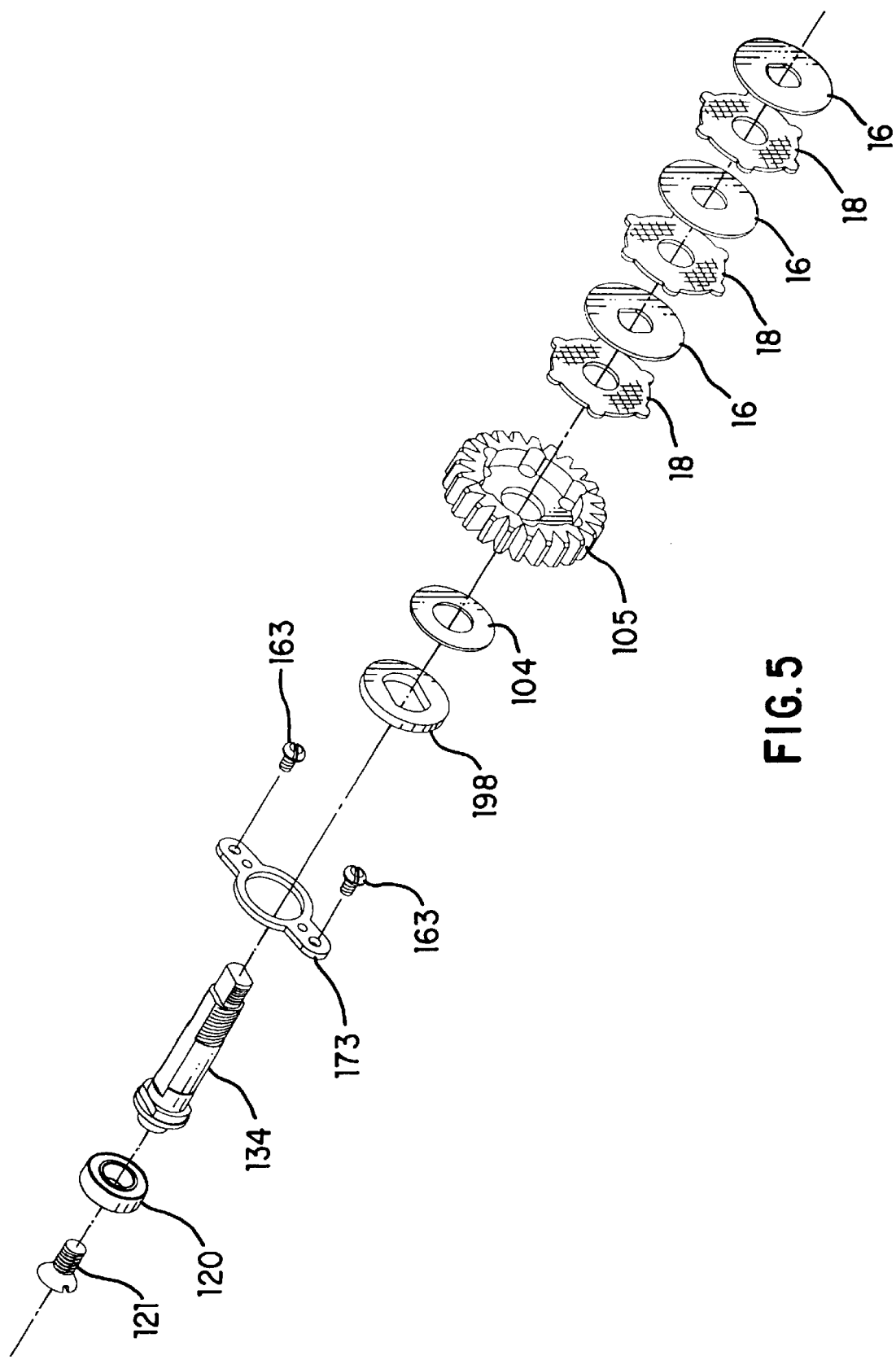
FIG. 5 is an exploded perspective view of a portion of a conventional revolving spool reel mechanism in accordance with my invention.

The main use of the preferred embodiment of my invention is to provide a clutch between a main gear and a gear stud in a revolving spool reel (a portion of which as shown in FIG. 5). Those parts comprise a screw 121, a ball bearing 120, a gear stud 134, a bearing retainer 173, retaining screws 163, a ratchet spacer 198, a fiber washer 104, a main gear 105, a plurality of friction drag washers 18, and a plurality of metal drag washers 16.

Figure 8A:
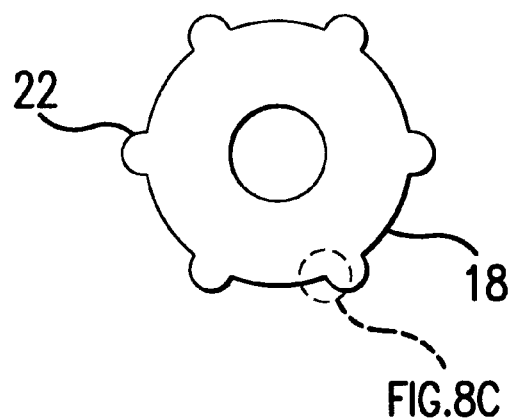
FIGS. 8A, 8B and 8C are enlarged views of a friction drag washer showing preferred dimensions.
Figure 8B:
Figure 8C:

The material of which the parts 18 are made is most preferably a composite material having a center laminated portion comprised of fiberglass with a binder resin such as epoxy and outer laminated graphite (carbon) portions forming the entire radial friction surfaces. The fiber composition is three layers of epoxy impregnated glass fibers, which are sandwiched between layers of woven graphite cloth. The laid-up drag material is compressed and cured to produce the drag material. The final thickness is 0.050 inches, plus or minus 0.005 inches, and has a high co-efficient of friction; most preferably 0.14. This material must be of sufficient strength to prevent the ears 22 from collapsing due to the forces exerted by the drag mechanism. The preferred dimensions of a drag friction washer are shown in FIGS. 8A, 8B and 8C.

Figure 9A:
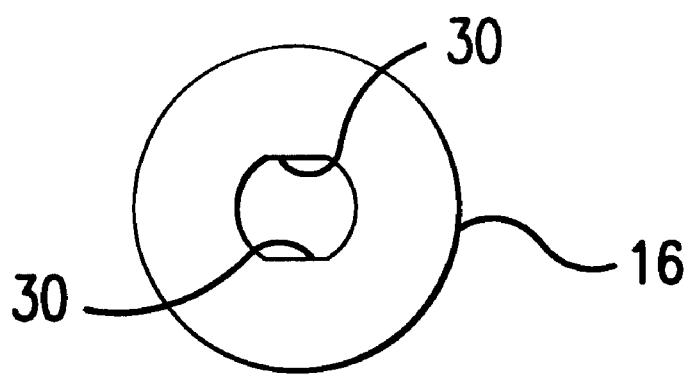
FIGS. 9A and 9B are enlarged views of a metal drag washer showing preferred dimensions.
Figure 9B:

The metal washers (keyed to the gear stud) are made from 302 stainless steel. The preferred dimensions of the drag washer are shown in FIGS. 9A and 9B.

By arranging these washers in the staggered fashion shown, ie., so that the keyed metal washers 16 have their metal surfaces in contact with the friction surfaces of the eared friction drag washers 18, the advantages of this invention may be obtained.

Figure 7:
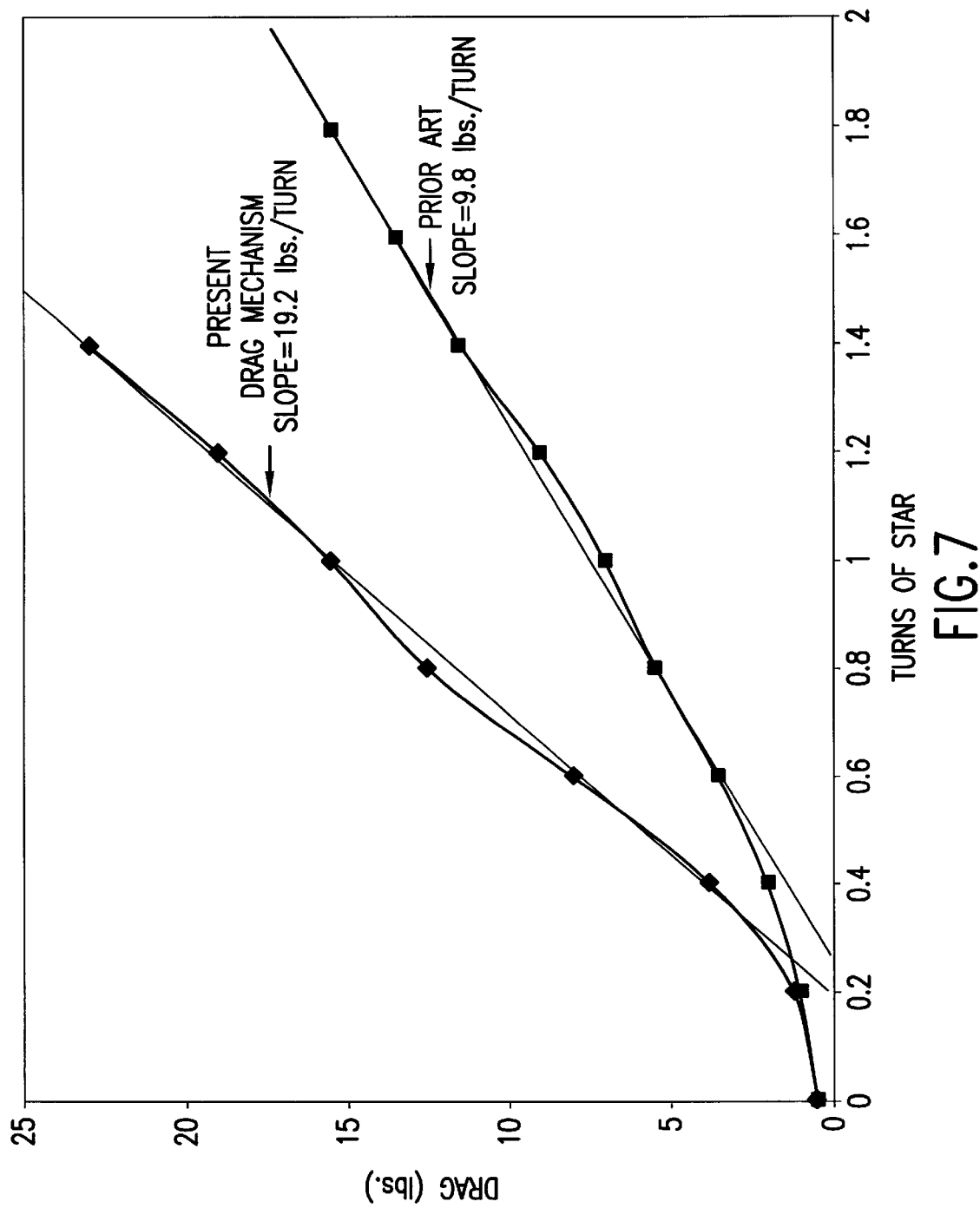
FIG. 7 is a plot of test data showing results using prior art drags as opposed to the variable drag of the present invention.

This mechanism dramatically increases the drag in this type of device. See the test results plotted on FIG. 7 which shows a slope of 19.2 pounds per turn using the drag mechanism of the present invention as opposed to the slope of 9.8 pounds per turn when using the prior art drag system. The diameters and numbers of washers used in both tests were identical.

Alternate arrangements of my invention are shown in FIGS. 1, 2 and 3.

In FIG. 1, three eared friction drag washers are shown adjacent to one another and three metal washers are shown adjacent to one another, such that only one friction drag surface engages one metal surface. This arrangement provides for the minimal drag using this number of washers.

In another alternate arrangement shown in FIG. 2, by simply changing the position of one eared friction drag washer with respect to one metal washer, the arrangement becomes one in which two eared friction drag washers are adjacent to one another and two metal washers are adjacent to one another in the stack. In this way, the amount of friction employed by the drag mechanism can be increased, even though the stack still takes up the same amount of space within the reel.

In the final arrangement shown in FIG. 3 identified as level 5, the stack is arranged in the manner shown in FIG. 5 to provide for the maximum amount of friction drag for this type of use.

These arrangements demonstrate the importance of my invention in that it gives the user the flexibility to adjust drag; albeit the user has to take the drag mechanism apart in order to rearrange the washers.

Figure 6:
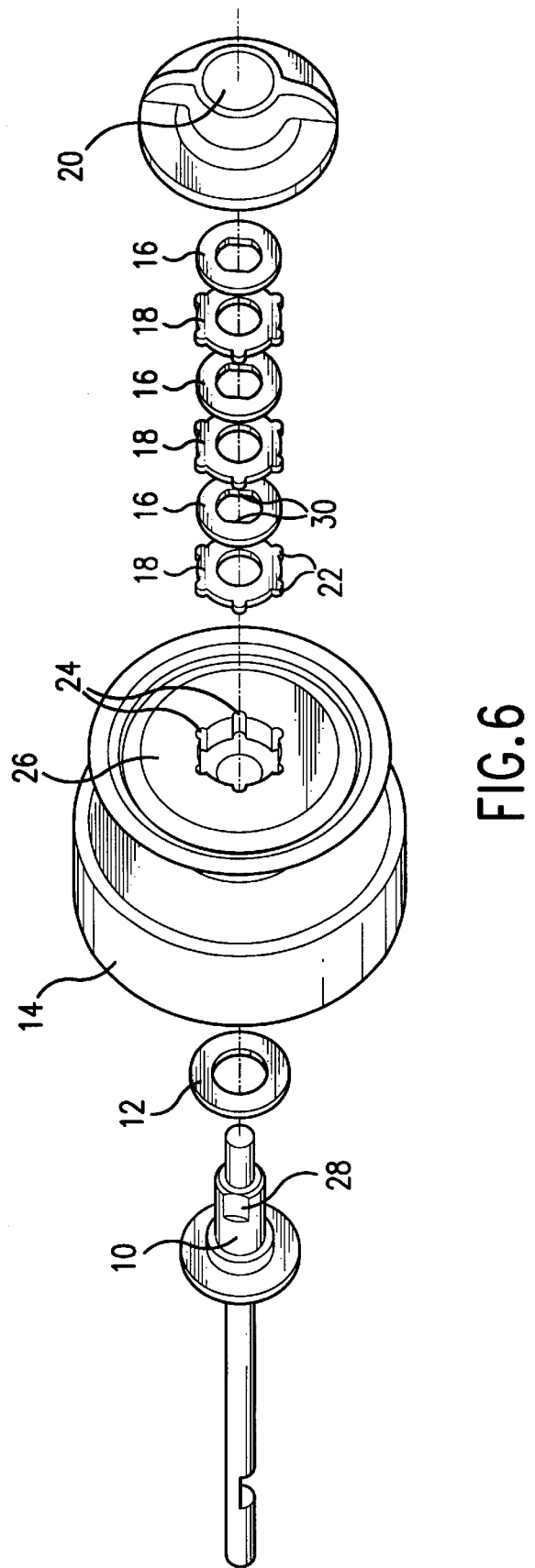
FIG. 6 is an exploded perspective view of a portion of a spinning or fixed reel mechanism in accordance with an alternate embodiment of my invention.

Referring to FIG. 6, it shows an exploded perspective view of a portion of a spinning reel showing a drag washer mechanism in accordance with an alternate embodiment of my invention. This comprises a spool stud shaft 10 having a fixed spool 14 including a gear 26 as part thereof. Mounted about this shaft 10, there are metal washers 16 keyed to it and eared friction drag washers 18 keyed to the main gear. On the outside end of the shaft, there is a drag adjustment knob 20. The eared washers have peripheral ears 22 which engage ear slots 24 in the main gear 26. Spool shaft 10 has diametrically opposed flat portions 28 which are keyed into the opposed flat portions 30 of the metal washers 16 so that the metal washers rotate therewith. The principle of arrangement and rearrangement of the washers is the same as that used in connection with the conventional revolving spool reel previously described.

What is claimed is:

1. In a fishing reel having a main gear with key slots therein and a shaft and a drag mechanism using a stack of washers, an improved drag stack comprising a plurality of washers at least one of which being made of a friction imparting material having a high co-efficient of friction and ears extending from the periphery thereof for engagement with said key slots in said main gear; and at least one of which washers comprises a metallic washer in keyed engagement with said shaft passing through said gear, for engagement with said friction imparting material washer to provide drag.

2. The fishing reel of claim 1 wherein at least two friction washers alternate with metal washers.

3. The fishing reel of claim 1 wherein at least three friction washers alternate with metal washers.

4. The fishing reel of claim 1 wherein the friction imparting material comprises a composite material having a center laminated portion comprised of fiberglass with a binder resin such as epoxy and outer laminated graphite portions forming the entire radial friction surfaces; said fiber composite material being three layers of epoxy impregnated glass fibers, which are sandwiched between layers of woven graphite cloth; compressed and cured to produce a drag material.

5. The fishing reel of claim 4 wherein the friction imparting material washers have a radius of approximately 0.570 inches and a width of approximately 0.050 inches.

6. The fishing reel of claim 4 wherein the friction imparting material washers have ears at approximately 60 degree intervals.

7. The fishing reel of claim 1 wherein the metal drag washers are stainless steel.

8. The fishing reel of claim 7 wherein the stainless steel washers have a diameter of approximately 1.120 inches, and a width of approximately 0.045 inches.

9. The invention of claim 7 wherein the stainless steel washers have a diameter of approximately 1.120 inches, and a width of approximately 0.055 inches.

10. The fishing reel of claim 1 wherein the friction material has a co-efficient of friction of approximately 0.14.

11. The fishing reel of claim 1 wherein the fishing reel is a conventional rotating spool reel.

12. The fishing reel of claim 1 wherein the fishing reel is a spinning fixed reel.

* * * * *